Patented Feb. 27, 1934

1,948,667

UNITED STATES PATENT OFFICE

1,948,667

PHENOL ETHERS AND PROCESS OF PREPARING THEM

Georg Kraenzlein and Arthur Voss, Frankfort-on-the-Main-Hochst, Germany, assignors to I. G. Farbenindustrie Aktiengesellschaft, Frankfort-on-the-Main, Germany No Drawing. Original application February 7, 1924, Serial No. 691,274. In Germany February 7, 1923. Divided and this application April 3, 1930, Serial No. 441,420

20 Claims. (Cl. 260—64)

The present invention relates to phenol ethers and to a process of preparing them.

We have found that the resinous condensation products obtained in the usual manner from aldehydes and phenols or their homologues enter in the form of their alkali metal salts easily into reaction with halogen compounds of the following formula:

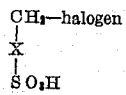

wherein X stands for an alkylene or phenylene group, particularly with aralkylhalide sulfonic acids, as for instance benzyl chloride sulfonic acids, or with chlorethanesulfonic acids. It is a surprising fact that thereby sulfonic acids are produced which are very readily soluble in water and which behave towards animal fiber like genuine tanning substances.

The new compounds correspond to the following formula:

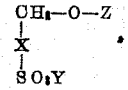

wherein X stands for an alkylene or phenylene group, Y stands for hydrogen or an alkali metal and Z stands for a condensation product from an aldehyde and a phenol.

The new tanning substances are distinguished by their particularly valuable properties which have not heretofore been observed with synthetic tanning substances. They behave like vegetable extracts and yield soft and full-bodied leathers which resemble the leathers produced with the aid of mimosa. The tanning effect is so excellent that the new products permit the saving of certain manipulations during the working up of the leather. An important property of the new tanning substances is the fact that they can be used quite alone, that is to say, without simultaneously using any additional substances. The extraordinary results obtainable with the new tanning substances as compared with those obtainable with other known synthetic products are evidently due to the presence of the external sulfonic groups.

Similar products are obtained by condensing the above mentioned halogen compounds of the formula:

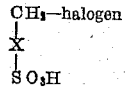

wherein X stands for an alkylene or phenylene group first with a phenol and then reacting the product thus obtained with an aldehyde.

Amongst the aromatic series there have proved to be suitable for instance nitrochlorobenzene sulfonic acid and sulfochlorobenzoic acid, and amongst the aliphatic series for instance chlorethane sulfonic acid.

Water-soluble condensation products possessing excellent tanning properties are also obtained by causing the components to act upon each other in presence or absence of catalytic substances, such as zinc chloride and aluminium chloride. It appears that the aralkylhalide sulfonic acids including the corresponding sulfo chlorides are not only capable of being condensed with already formed bodies of a phenolic or resinous character, but that they may be combined in general with the aromatic hydrocarbons of which such bodies of high molecular weight are composed, for instance, naphthalene, phenanthrene, carbazol and their homologues and derivatives or also with the resinous condensation products derived therefrom, so as to form water-soluble compounds possessing good tanning properties, the sulfonic acids showing in this case also a condensing action.

Finally the aralkylhalide sulfonic acids or their chlorides are also capable of yielding water-soluble glue-precipitating condensation products suitable for tanning animal skins by internal condensation, that is to say without addition of a second component.

The following examples illustrate our invention, but they are not intended to limit it thereto, the parts being by weight:

1. 150 parts of the sulfonic acid of benzyl-phenyl-ether obtained by reacting on a mixture of sodium-ortho- and para-benzylchloride-sulfonate with so-called washed carbolic acid, i. e. with a mixture of phenol, cresol and higher homologues, are mixed with 65 parts of formaldehyde of 30 per cent, 300 parts of water and 30 parts of hydrochloric acid; the solution is then boiled for several hours in a reflux apparatus, the undissolved portion is filtered off, the filtrate neutralized by adding an alakli and then evaporated in vacuo. By evaporating, a syrupy mass is obtained which, after it has been slightly acidified and its content of tanning principle ascertained, can be directly used for tanning purposes.

The tanning process is carried out in the following manner:

To 100 parts of the skin so much tanning solution diluted with water is applied as corresponds to 23-25 parts of tanning substance, the solution being added within 16 hours and in increasing portions to the scouring vat over a period of 16 hours. After 20-24 hours, the tanning process is complete. The leathers are then rinsed, stretched out and dried. They are very light, full and soft and resemble in every respect the leathers tanned with the aid of vegetable extracts.

2. 120 parts of a mixture of xylolsulfochlorides, produced by treating commercial xylene with chlorosulfonic acid, are converted into a mixture of the corresponding methylated benzylchloridesulfochlorides by the introduction of chlorine. After saponification and transformation into an aqueous solution of the alkali compound of the tolylchloridesulfonic acids the said solution is converted into the benzylethersulfonic acid of the tetrahydronaphthol by treatment with an alkaline solution of beta-tetrahydronaphthol. The benzylethersulfonic acid of the tetrahydronaphthol is isolated by acidifying and shows tanning properties. The body thus obtained is mixed with 400 parts of water and 40 parts of formaldehyde (30 per cent) and the resulting mixture is boiled, while adding 10-12 parts of concentrated hydrochloric acid, until the aldehyde has disappeared for the most part and a sample of the solution shows strong precipitating action upon a solution of gelatine. The resulting solution may, just as well as that prepared according to the foregoing example, be directly used for tanning purposes and the tanning substance may also be concentrated by evaporation and separation of its inorganic components.

3. 175 parts of the sulfoethylether produced by the action of sodium-1-chlorethanesulfonate upon beta-tetrahydronaphthol, are dissolved in a sufficient quantity of water (400-600 parts), this solution is mixed with 60 parts of formaldehyde (30 per cent) and 30 parts of concentrated hydrochloric acid and kept boiling, while cooling in the reflux apparatus, until the aldehyde has for the most part disappeared and the test sample shows a strong precipitation of gelatine.

4. 50 parts of commercial cresol (a mixture of the three isomerides) are mixed with 125 parts of ortho - chloro - para - benzylchloridesulfonic acid, this mixture is then cautiously heated until the evolution of hydrogen chloride sets in. The mass is kept at this temperature, advantageously while stirring, and only gradually the temperature is raised, finally to 140° C.-150° C. After the reaction is complete and a test sample dissolves well in water, the unaltered cresol is expelled with direct water-vapor and the residue worked up by concentrating it in vacuo. Thus a resinous product is obtained which is readily soluble in water and of a brownish-yellow color and which when used for treating animal skins converts the latter into an excellent leather.

The structural formulæ of the compounds and the course of reactions involved in the preparation of the compounds in accordance with the foregoing examples are supposed to be as follows:

*Example 1*

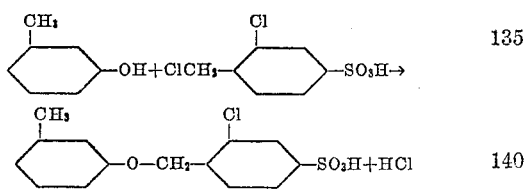

*Example 2*

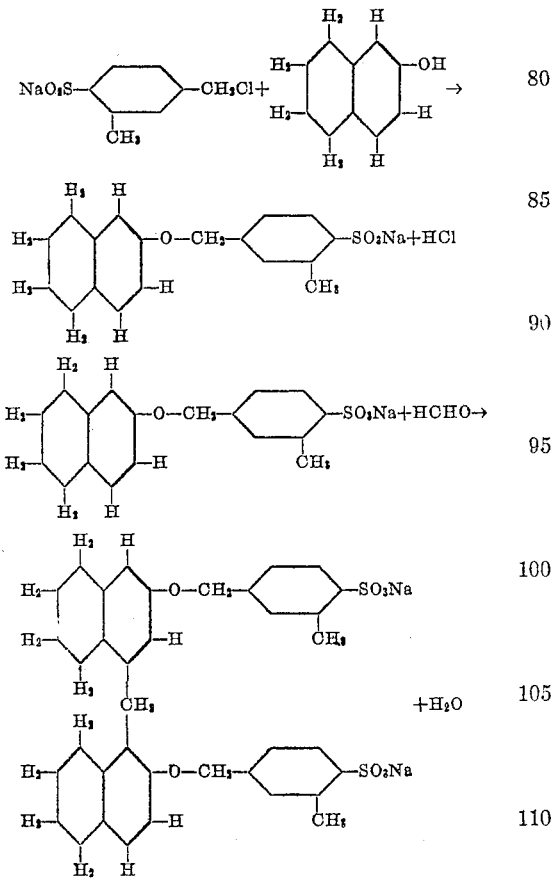

*Example 3*

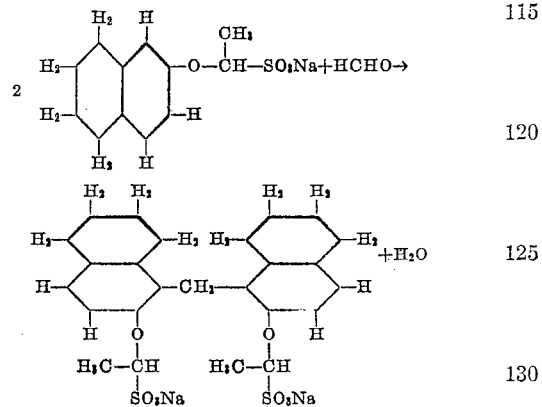

*Example 4*

This application is a division of our co-pending U. S. patent application Serial No. 691,274 filed February 7, 1924, now Patent No. 1,825,802 of Oct. 6, 1931.

The following claims call for the use of halogen compounds of the formula:

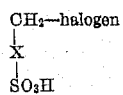

Some of the claims refer to the presence of an alkaline agent, and it should be pointed out that the use of a salt of the acid from the very beginning is considered the equivalent of the use of the free acid in an alkaline solution.

We claim:

1. Process of preparing tanning substances which comprises reacting a sodium benzylchloride sulfonate with a phenol.

2. Process of preparing tanning substances which comprises reacting a sodium benzylchloride sulfonate with a phenol in the presence of water and an alkaline agent which is capable of dissolving the phenol.

3. Process of preparing tanning substances which comprises reacting a sodium benzylchloride sulfonate with cresol.

4. Process of preparing tanning substances which comprises reacting a sodium benzylchloride sulfonate with cresol in the presence of water and an alkaline agent which is capable of dissolving the cresol.

5. Process of preparing tanning substances which comprises reacting a sodium benzylchloride sulfonate with a phenol and condensing the product obtained with formaldehyde.

6. Process of preparing tanning substances which comprises reacting a sodium benzylchloride sulfonate with a phenol in the presence of water and an alkaline agent which is capable of dissolving the phenol and condensing the product obtained with formaldehyde.

7. Process of preparing tanning substances which comprises reacting a sodium benzylchloride sulfonate with cresol and condensing the product obtained with formaldehyde.

8. Process of preparing tanning substances which comprises reacting a sodium benzylchloride sulfonate with cresol in the presence of water and an alkaline agent which is capable of dissolving the cresol and condensing the product obtained with formaldehyde.

9. As new products, the tanning substances obtainable by reacting a sodium benzylchloride sulfonate with a phenol, said products being phenol ethers forming homogeneous brownish colored solutions of syrupy consistency, being easily soluble in water and alkalies, precipitating gelatine from its solution and giving characteristic colorations with ferric salts.

10. As new products, the tanning substances obtainable by reacting a sodium benzylchloride sulfonate with a phenol, in the presence of water and an alkaline agent which is capable of dissolving the phenol, said products being phenol ethers forming homogeneous brownish colored solutions of syrupy consistency, being easily soluble in water and alkalies, precipitating gelatine from its solution and giving characteristic colorations with ferric salts.

11. As new products, the tanning substances obtainable by reacting a sodium benzylchloride sulfonate with a phenol and condensing the product obtained with formaldehyde, said products being phenol ethers forming homogeneous brownish colored solutions of syrupy consistency, being easily soluble in water and alkalies, precipitating gelatine from its solution and giving characteristic colorations with ferric salts.

12. As new products, the tanning substances obtainable by reacting a sodium benzylchloride sulfonate with a phenol in the presence of water and an alkaline agent which is capable of dissolving the phenol and condensing the product obtained with formaldehyde, said products being phenol ethers forming homogeneous brownish colored solutions of syrupy consistency, being easily soluble in water and alkalies, precipitating gelatine from its solution and giving characteristic colorations with ferric salts.

13. The process which comprises reacting upon a compound of the formula

wherein X stands for an alkylene or phenylene group with a phenol.

14. The process which comprises reacting upon a compound of the formula

wherein X stands for an alkylene or phenylene group with a phenol in the presence of water and an alkaline agent which is capable of dissolving the phenol.

15. The process which comprises reacting upon a compound of the formula

wherein X stands for an alkylene or phenylene group with cresol.

16. The process which comprises reacting upon a compound of the formula

wherein X stands for an alkylene or phenylene group with cresol in the presence of water and an alkaline agent which is capable of dissolving cresol.

17. The process which comprises reacting upon a compound of the formula

wherein X stands for an alkylene or phenylene group with a phenol and then condensing the product thus obtained with formaldehyde.

18. The process which comprises reacting upon a compound of the formula

wherein X stands for an alkylene or phenylene group with cresol and then condensing the product thus obtained with formaldehyde.

19. The products obtainable by reacting a compound of the formula

wherein X stands for an alkylene or phenylene group with a phenol, said products being phenol ethers forming homogeneous brownish colored solutions of syrupy consistency, being easily soluble in water and alkalies, precipitating gelatine from its solution and giving characteristic colorations with ferric salts.

20. The products obtainable by reacting a compound of the formula

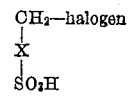

wherein X stands for an alkylene or phenylene group with a phenol in the presence of water and an alkaline agent which is capable of dissolving the phenol, said products being phenol ethers forming homogeneous brownish colored solutions of syrupy consistency, being easily soluble in water and alkalies, precipitating gelatine from its solution and giving characteristic colorations with ferric salts.

GEORG KRAENZLEIN.
ARTHUR VOSS.